H. S. BOOTH.
CALCULATING MACHINE.
APPLICATION FILED MAY 2, 1912.

1,133,917.

Patented Mar. 30, 1915.
8 SHEETS—SHEET 1.

WITNESSES

INVENTOR
Henry S. Booth
by

H. S. BOOTH.
CALCULATING MACHINE.
APPLICATION FILED MAY 2, 1912.
1,133,917.
Patented Mar. 30, 1915.
8 SHEETS—SHEET 3.
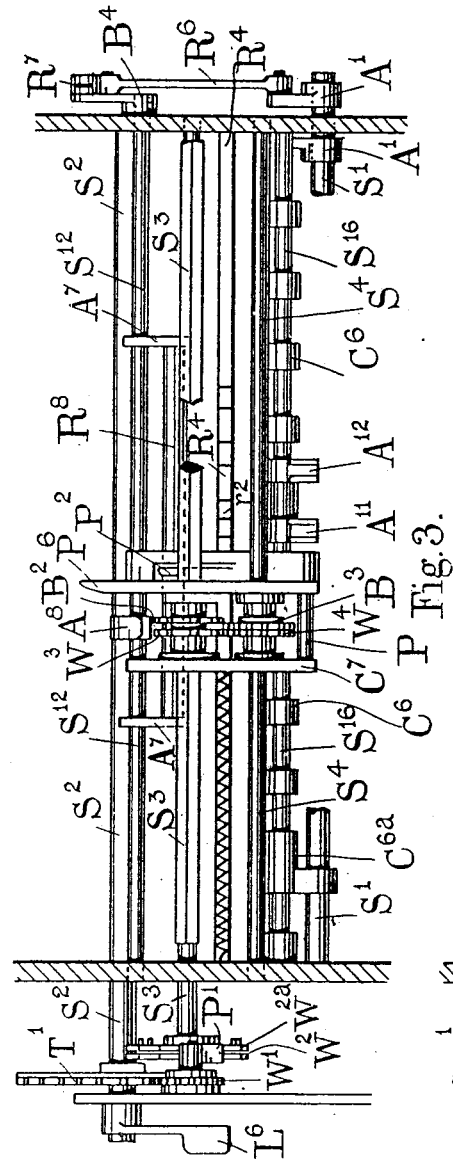
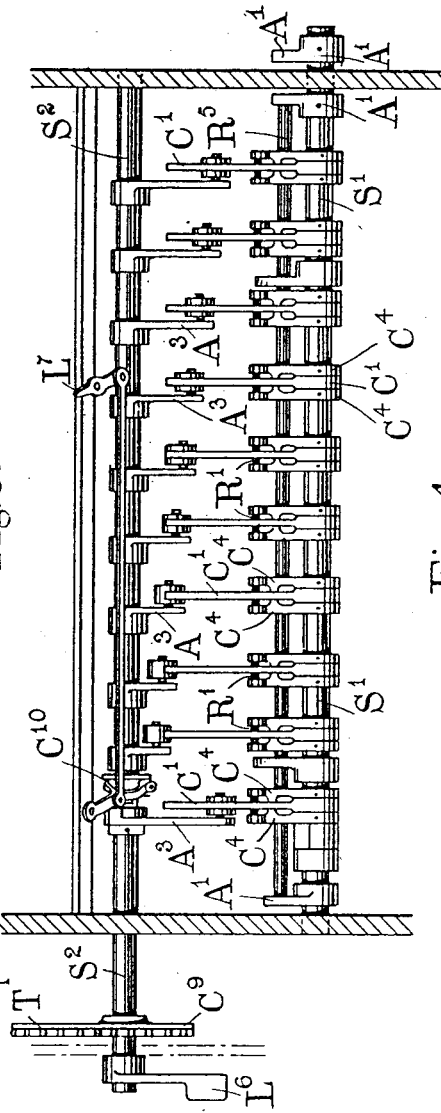
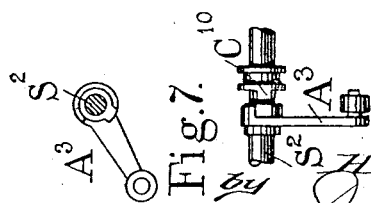
WITNESSES
INVENTOR
Henry S. Booth H. S. BOOTH.
CALCULATING MACHINE.
APPLICATION FILED MAY 2, 1912.
1,133,917.
Patented Mar. 30, 1915.
8 SHEETS—SHEET 6.
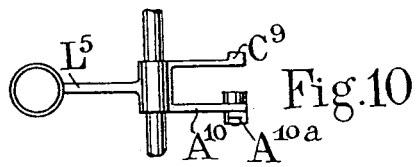
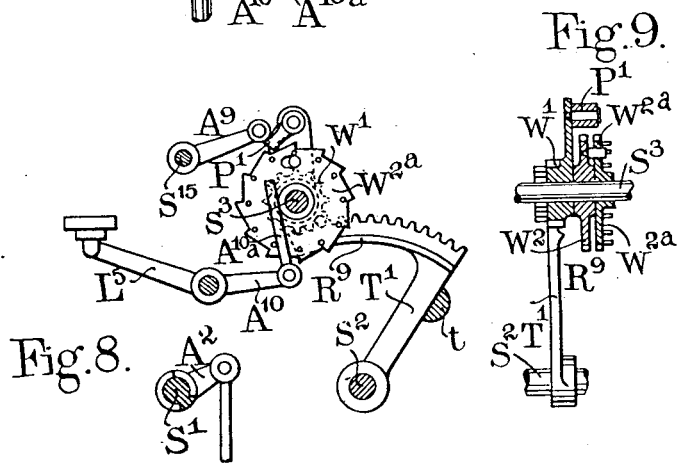
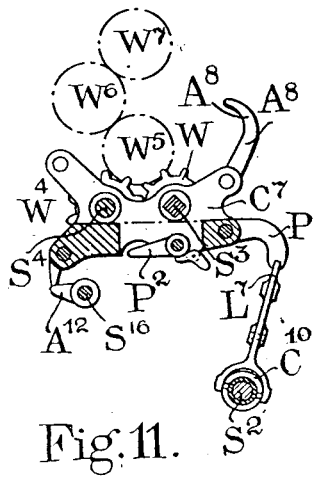
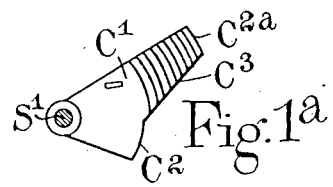
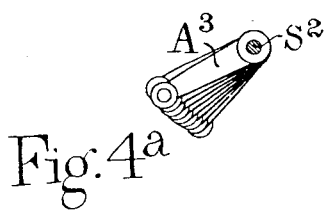
WITNESSES
INVENTOR
Henry S. Booth
by

H. S. BOOTH.
CALCULATING MACHINE.
APPLICATION FILED MAY 2, 1912.

1,133,917.

Patented Mar. 30, 1915.
8 SHEETS—SHEET 7.

WITNESSES.

INVENTOR
Henry S. Booth
by
James L. Norris
Atty.

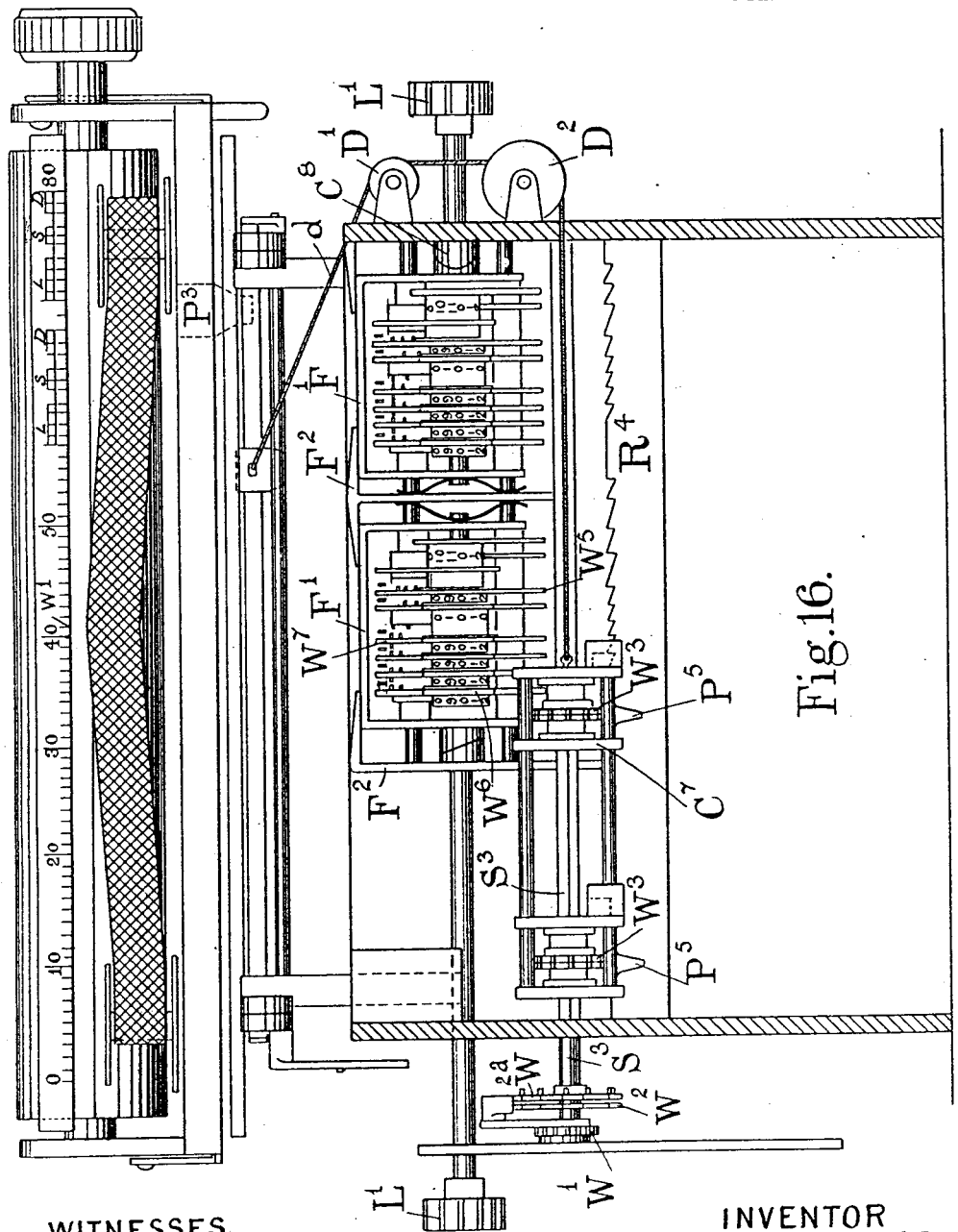

UNITED STATES PATENT OFFICE.

HENRY SHEPLEY BOOTH, OF MANCHESTER, ENGLAND.

CALCULATING-MACHINE.

1,133,917.  Specification of Letters Patent.  Patented Mar. 30, 1915.

Application filed May 2, 1912. Serial No. 694,741.

*To all whom it may concern:*

Be it known that I, HENRY SHEPLEY BOOTH, a British subject, residing at Manchester, county of Lancaster, England, have invented certain new and useful Improvements in Calculating-Machines, of which the following is a specification.

This invention relates to calculating mechanism which may be used in conjunction with or applied to most of the well known makes of type writing machines or may be constructed separately merely for calculating purposes.

The invention comprises improved construction and arrangement of parts for operating the calculating wheels either for addition or subtraction; for connecting the numeral keys and type levers therewith and for controlling and operating the totalizing mechanism.

The invention will be fully described with reference to the accompanying drawings in which as an example it is shown as applied to one construction of type writing machine.

Figure 1:
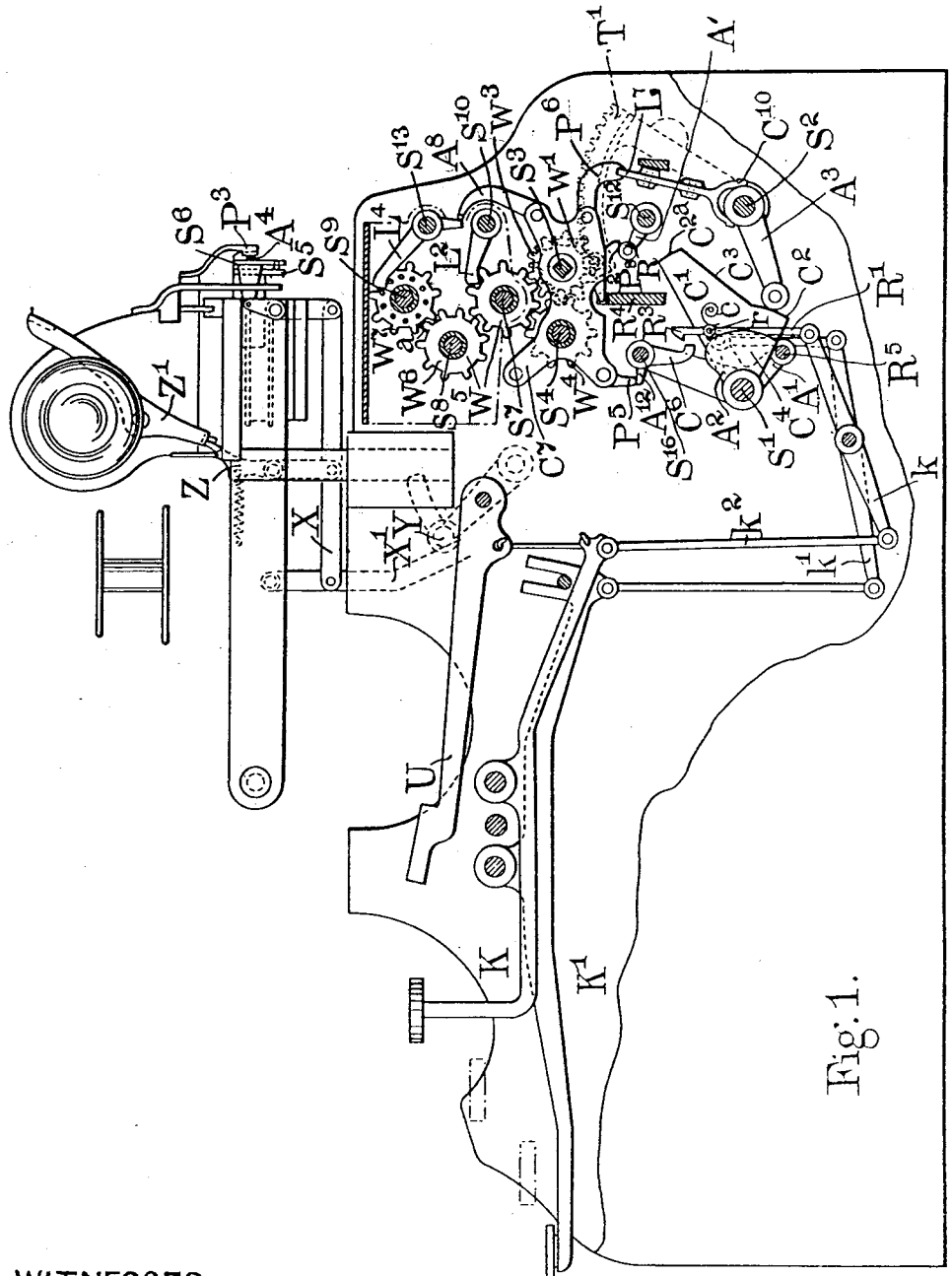
Figure 2:
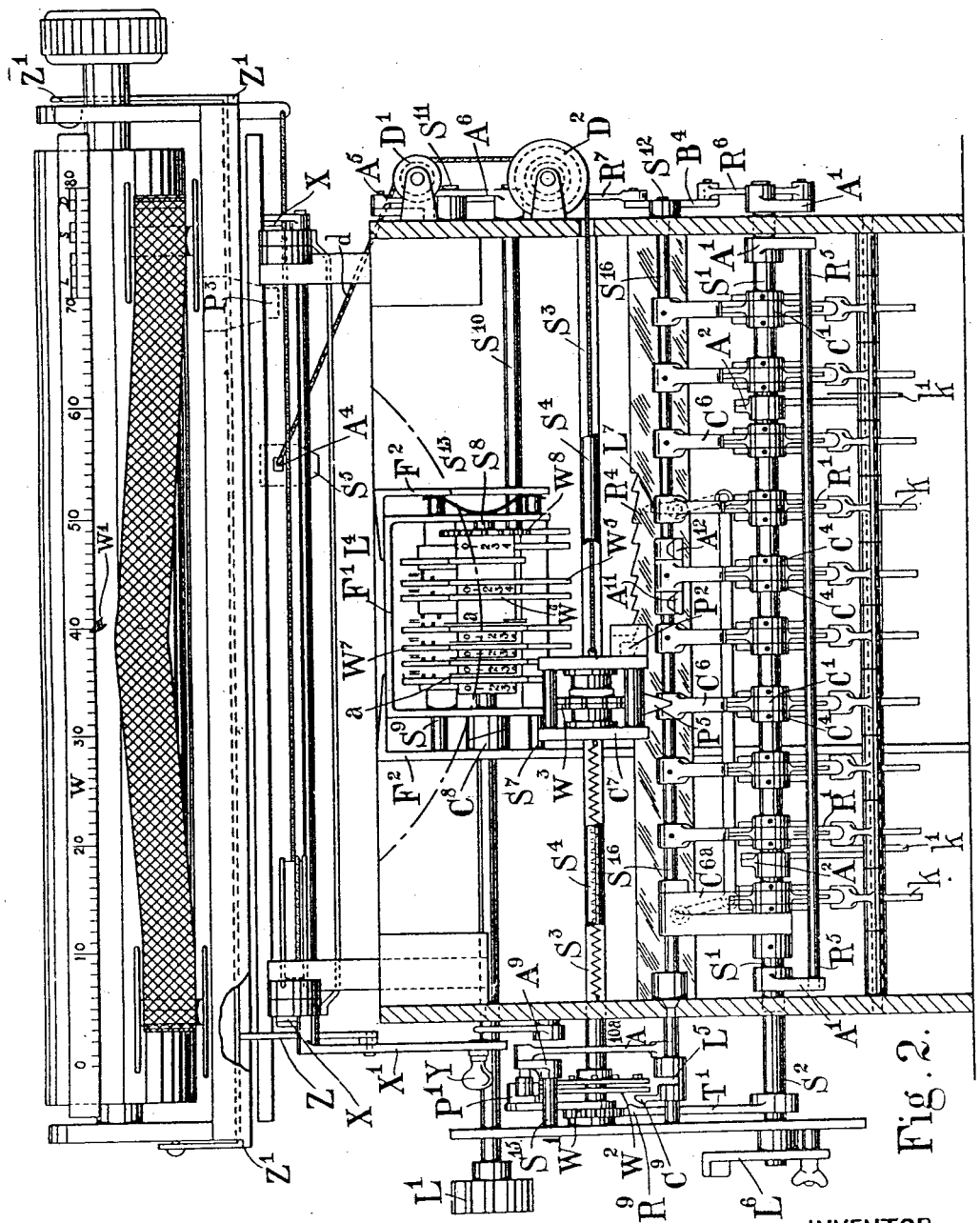
Figure 5:
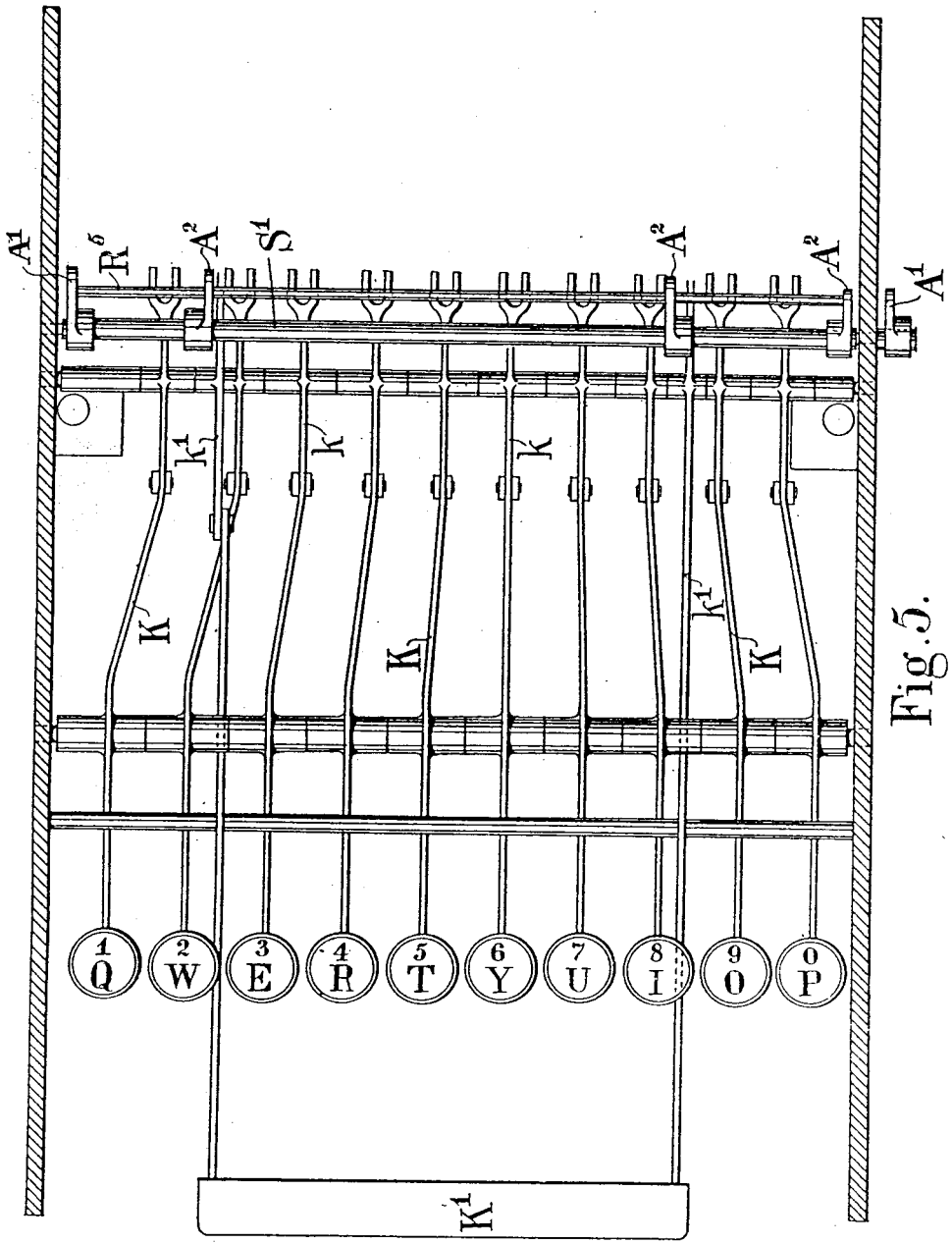
Figure 12:
Figure 6:
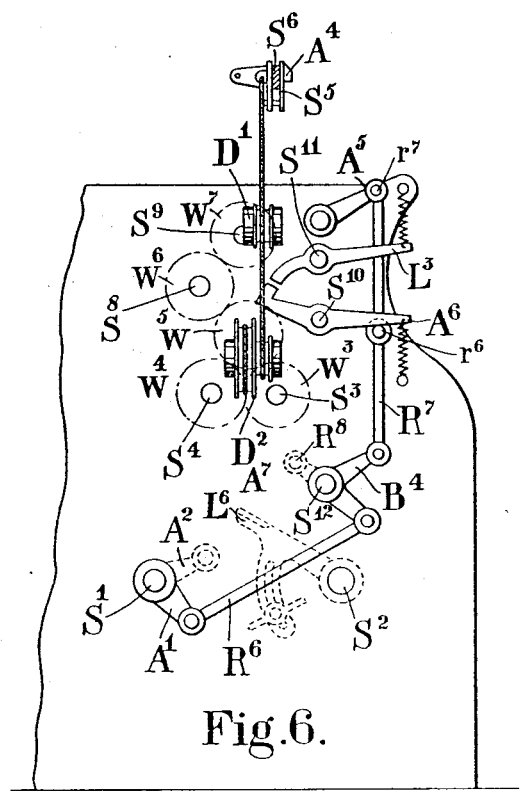
Figure 13:
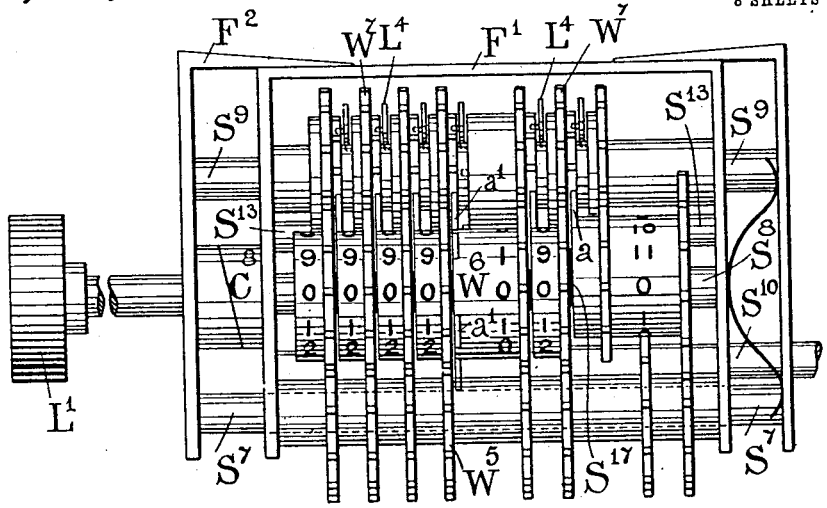
Figures 14, 15:
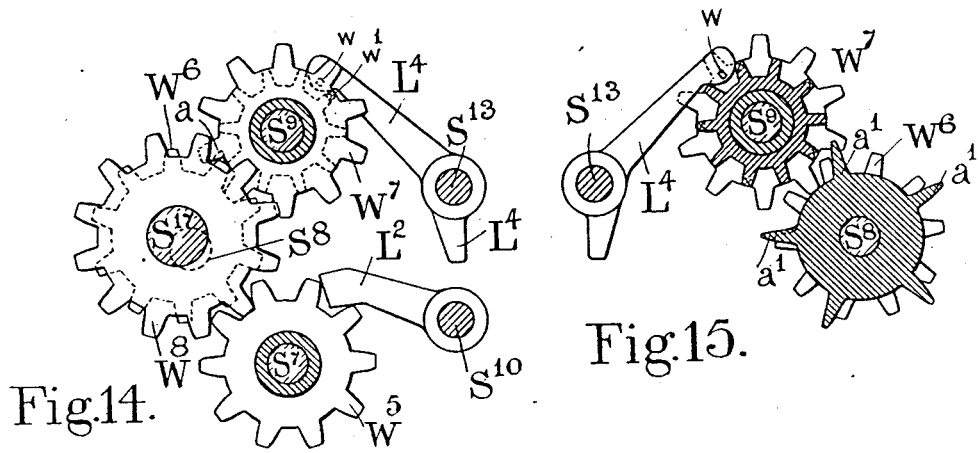

Figure 1. is a side elevation partly in section. Fig. 1ª. is a detail view of a modified form of cam plate. Fig. 2. is a front elevation partly in section with the key board removed. Fig. 3. is a plan of carriage C⁷ and parts relating thereto. Fig. 4. is a plan view of the cam plates and the roller levers. Fig. 4ª. is a detail view showing the arrangement of the roller levers. Fig. 5. is a plan view of the numeral keys and connections. Fig. 6. is a side elevation of the locking gear. Fig. 7. shows details of the roller levers for numeral keys 1 and 10. Figs. 8 and 9. are detail views showing a sector which is employed and the pawl and ratchet wheels associated therewith. Fig. 10. is a plan of the lever for operating same. Fig. 11. is a side elevation of the carriage. Fig. 12. is a plan of a stop and bar which are employed. Fig. 13. is an enlarged front elevation of the totalizer. Fig. 14 is a section of same showing the pence wheels. Fig. 15 is a section of same showing the ten shillings wheels from the opposite side. Fig. 16 is a front elevation showing double totalizers.

The type writing machine is constructed of any ordinary type or pattern, one such machine of known construction being shown with numeral keys K and type bars U which are connected to my improved calculating apparatus by levers $k$ and connecting rods or links $k^2$. The calculating apparatus which may be connected to the keys of any class of type writing machine in a similar manner is constructed with a number of cam plates C'—one for each numeral key K—carried by a shaft S' extending across the machine. A corresponding number of roller-carrying levers $A^3$ are mounted on a sector shaft $S^2$, and with these roller levers $A^3$ the cam plates C' engage. On the end of the sector shaft $S^2$ a toothed sector T' is fixed which is oscillated by any one of the numeral keys K through the cam plates C' and roller levers $A^3$. The roller levers $A^3$ are set at different angles upon the shaft $S^2$ (see Figs. 4 and 4ª), so that while the cam plate C' of the numeral key 9 will at once engage and operate its roller lever, giving it a longer movement, the cam plate C' of the numeral key 2 or 1 will travel some distance before engaging its roller lever $A^3$, giving it a much shorter movement, the intermediate roller levers receiving a movement corresponding to the numeral key connected therewith. Instead of setting the roller levers $A^3$ in this way the length of the cam plates C' may vary in length (see Fig. 1ª.) and the roller levers be all set square or parallel on the shaft $S^2$, or the roller levers $A^3$ may vary in length according to the numeral key K with which they are connected, the lever being longer for the numeral key of higher denomination. All these arrangements give the same result that the shaft $S^2$ and sector T' will be rotated a greater degree when a numeral key K of higher denomination is operated than when a key of lower denomination is operated.

The cam plates C' are each of similar shape, with concentric surfaces $C^2$ and $C^{2a}$ connected by a cam or crank surface $C^3$, which latter engages its corresponding lever $A^3$ when depressed. Each cam plate C' is connected to its key K by an upright rod R', a lever K and a link $K^2$ the rod R' being fitted with a cross pin $r$ engaging in a slot in the cam plate and formed with a hook $R^3$ at its upper end. At opposite sides of each cam plate C' guide plates $C^4$ mounted on the cam shaft S' are placed, and these guide plates hold the connecting rods R' at the back of the slots against the pressure of springs $c$ which tend to move said rods in the opposite direction and, when the guide plates are withdrawn, allow the hooked ends R³ of the rods to engage hooked stops or catches C⁶ of suitable shape to lock the said rods R' and prevent their downward movement. The guide plates C⁴ rest on a transverse bar or shaft R⁵ carried by guide arms A'. When any one of the cam plates C' is depressed it carries with it all the guide plates C⁴ which are depressed at the same time thereby locking all the other keys, connecting rods and their cam plates in their upright position. The top corners of the guide plates C⁴ are rounded to set back all the connecting rod hooks R³ clear of the stops on the return of the key. An additional arm A² on the cam shaft S' is connected by rods or links k' with the spacing bar K' of the type writer, to permit of the movement of the platen and of the carriage C⁷ without any of the numeral keys K being operated. The shaft S' is free to rotate without moving the arm A², but the movement of the arm A² rotates the shaft S', owing to said arm being provided with a stop or abutment a² which engages a projection s on the shaft S'.

The carriage C⁷ is mounted to travel to and fro across the machine on a shaft S³ which is preferably rectangular and on a secondary or guide shaft S⁴. On the end of the carriage shaft S³ a wheel W' is mounted, which wheel is engaged by the toothed sector T' by which the shaft S³ is rotated.

The wheel W' is loose on the end of the shaft S³ and to it is attached an arm carrying a pawl P' which engages with a ratchet wheel W² affixed to the shaft. This allows the wheel W' to rotate freely in one direction, but rotates the shaft when moved in the opposite direction. The pawl P' rotates the shaft S³ on the return stroke of the sector T'. This is effected by a coil spring p fitted within the wheel W' which is wound up on the forward rotation of the sector T' and rotates the wheel W' in the reverse direction on the return stroke of the sector. This arrangement of spring prevents any back lash between the teeth of the wheel W' and the sector T' and brings the pawl P' uniformly to a position governed by the roller lever A³ resting against the curved surface C² of the cam plate C⁴, thereby preventing any wrong engagement of the pawl P' with the ratchet wheel W².

The carriage has fitted within it two wheels W³ on the shaft S³ and two wheels W⁴ loose on a secondary or guide shaft S⁴. One of the wheels W³ on the shaft S³ gears direct with the counting or totalizing mechanism, and the other wheel W³ gears with one wheel W⁴ on the shaft S⁴, the other wheel W⁴ on the shaft S⁴ being connected thereto and gearing with the wheel W⁵ of the counting or totalizing mechanism when the latter is moved out of gear with the first wheel W³. These wheels are so placed that by slightly altering the position of the totalizing mechanism in relation thereto either one can be brought into mesh therewith. As these wheels are geared together, they rotate in reverse directions so that one is employed for addition and the other for subtraction.

The carriage C⁷ is connected by a cord d passing over a suitable differential drum D² with the paper carriage of the machine, the differential drum D² giving the correct movement equal to the spaces of the totalizer, while the paper carriage moves its normal distance. The position of the carriage C⁷ is shown by L. S. D. spacing on the position indicator w to which an index finger w' points, and such position is controlled by a pawl P² on said carriage which engages the teeth r² of an auxiliary rack R⁴.

When the carriage C⁷ passes into the cash spaces, that is when the index finger w' points to the L. S. D. marking on the scale W, a stop or projection P³ fixed on the paper carriage engages a sliding projection A⁴ to which the carriage C⁷ is connected by the cord d, and the carriage C⁷ is hauled across the rack R⁴. The sliding projection A⁴ is fixed to slides S⁵ and is carried on a bar S⁶ which is thrown into the path of the projection P³ through the levers X and X' each time the numeral shift key is depressed and locked. The depending lever X' is formed with a cam or bent arm which, on the raising of the carriage by the depression of the numeral shift key, engages a handle Y, causing the levers X' and X to move a pivoted lever Z connected to the carriage release lever Z' which throws the paper carriage rack out of gear and puts the carriage C⁷ under the influence of the rack R⁴. The release of the pawl P² of the calculator carriage C⁷ is effected by an attachment R⁸ to the locking mechanism (see Fig. 6).

The wheels W³ and W⁴ carried by the carriage and rotated by the sector T' are, as the carriage traverses the shaft S³, brought successively into mesh with the wheels W⁵ of the totalizing mechanism. The wheels W³ gear with the wheels W⁶, and on drums attached to the wheels W⁶ the numbers indicated by the machine are shown through a slot. The wheels W³ gear with the wheels W⁷, and the carry over is effected by a projection a on the wheel W⁶ engaging with a pin or tooth on the next wheel W⁷ of higher value, which moves the latter rather more than the space of a tooth every time 9 moves to 0 on the indicator drum attached to the wheel W⁶. The totalizer wheels W⁷ are set back to true alinement by a locking gear which leaves the projection on the first wheel clear of the pins or teeth on the succeeding wheel of higher value.

The wheels of the totalizer are carried in a movable frame F' on three (or more) shafts S⁷ S⁸ and S⁹ mounted in a fixed frame F², and on one side of the frame F' a cam C⁸ is fitted by which it and the wheels can be moved in one direction against the pressure of a spring by rotating the knob L', to bring the totalizer wheels into gear with one or other of the setting wheels W³ and W⁴ of the carriage C⁷. This movement is about the distance of one-third of a tooth on the auxiliary rack. In normal position the wheels are rotated in one direction for addition, and when moved by the cam C⁸ to the other position are rotated in the reverse direction for subtraction. For subtraction the carry over will operate in the reverse way and subtract 1 from the next higher indicator drum every time an indicator drum is turned from 0 to 9. A fixed tooth (not shown) may be fitted to the frame with which the teeth of the wheels W³ and W⁴ on the calculator carriage C⁷ engage when crossing the space between L and S and S and D, to prevent the wheels W³ and W⁴ being displaced when moving from one set of totalizer wheels to the next.

The various parts of the mechanism are locked by suitable devices, and released when desired to prevent one key being depressed before another has been returned to its normal position, to prevent movement of the totalizer wheels and to prevent movement of the calculator carriage when not in operative position (see Figs. 1, 2, 6 and 14).

A locking pawl L², which engages with the teeth of totalizer wheels W⁵ of each value and denomination, is carried on a suitable shaft S¹⁰ and on shaft S¹⁰, is mounted a locking lever A⁶ with which a second locking lever L³ engages. An arm or lever A' on the cam shaft S', which is moved by the depression of the key K, is connected by connecting rod R⁶ and bell crank lever B⁴ to connecting rod R⁷ and parallel arm A⁵. The depression of the key operates these levers and draws down the connecting-rod R⁷, which latter has two pins r⁷, and r⁶, thereby moving the second locking lever L³ out of the path of the first locking lever A⁶ and allowing the locking pawls L² to be lifted by a spring away from the teeth of the totalizer wheels.

A separate locking gear is provided for the carry over wheels W⁷ of the totalizer, and this gear preferably embodies pawls L⁴ which are fitted between each pair of wheels W⁷ and are provided each with a lock pin w that is normally placed between two of the pins of the teeth of each wheel W⁷ such arrangement permitting said wheel to move something less than half the space of a tooth in either direction. On the adjoining wheel, a pin w' is provided which engages with a double cam or wedge on the end of pawl L⁴. When the carry over operates in either direction, the pin w' raises the locking pawl L⁴ and with it the lock pin w, to allow the wheel affected by the carry over to move one tooth only, after which the wheel is relocked by said pin (see Fig. 14). To release the wheels to be operated on the return stroke of the sector T', a releasing arm A⁸ with a double cam surface (or face inclined in two directions), see Fig. 3, and curved to avoid the locking arm shaft S¹⁰, is mounted upon the calculator carriage which, on the wheels W³ and W⁴ being set in engagement with any of the totalizer wheels, presses against the bottom arm of the locking pawl L⁴ and raises the latter out of contact with the pins. The releasing arm A⁸ controls the locking pawl L⁴ whether the totalizer is set to add or subtract.

To prevent the ratchet wheel W² over running its starting position, a stop arm A⁹ mounted upon a stud S¹⁵ engages a pawl P' and locks it against a ratchet tooth, thus preventing further rotation, see Fig. 8. If any key be insufficiently depressed, the machine will remain locked by reason of the releasing pin r⁷ not having been moved sufficiently to reach and move the locking lever L³. A second ratchet wheel W²ᵃ is fitted alongside the ratchet wheel W² on the carriage shaft S² and is connected therewith by a pin projecting into a short slot in the latter, the teeth of both wheels being kept normally in line by a spring. The second ratchet W²ᵃ is fitted with laterally projecting pins, one for each tooth. The pawl P', which engages and rotates the ratchet W², carries on one side a cam which rides over the teeth of the second ratchet W²ᵃ. A key lever L⁵ with a projecting arm A¹⁰ is pivoted at the end of the machine adjacent to the ratchet wheels, with the arm A¹⁰ below and clear of the pins projecting from the second ratchet W²ᵃ. By depressing this lever, the arm A¹⁰ is lifted to engage one of the pins on the second ratchet wheel W²ᵃ, thereby moving that ratchet half a tooth backward or in the reverse direction to that in which the ratchets are moved by the pawl P'. This movement of arm A¹⁰ is transmitted to pawl P' through the agency of a connecting rod or link A¹⁰ᵃ, which raises said pawl clear of the teeth of the other ratchet wheel W² and allows the sector T' to return to normal position against the stop t. On one side of the sector T' a bevel flange or ridge R⁸ is formed which engages with a spring catch C⁹ (Figs. 2 and 10) on a second arm provided on lever L⁵ and prevents the latter returning to normal position until the sector has completed its return to normal position against its stop t'. To the end of the sector shaft S² a lever L⁶ is affixed, by which the sector shaft can be rotated to move all the roller levers A³ thereon out of the path of their respective cams C', thereby leaving the machine free to be used for ordinary type writing without calculating. The stop catches C⁶, with which the hooks R³ of the rods R' of the numeral keys K engage, are, with the exception of the catch C⁶ᵃ of the key K for the numeral 1, fixed to the shaft S¹⁶ so that all move together, and this catch C⁶ᵃ of the numeral 1 is loose thereon so as to remain stationary, while the others are moved to and from their respective hooks.

When the carriage C⁷ passes into the space for tens of shillings, a projection P⁵ thereon engages with the arm A¹¹ and moves all the catches C⁶ corresponding to the numeral keys 2 to 0 into the path of the hooked key rods R', thereby locking all the keys except that for the numeral 1. The indicating drum on the wheel W⁶ then in gear has five projecting points a' and the adjacent wheel W⁷ has five pins a² for the purpose of carrying on from tens of shillings to units of pounds. After the carriage passes arm A¹¹ the catches C⁶ are re-set or return to normal by their own weight or by a spring (not shown), (see Fig. 14). When the carriage C⁷ passes into the pence space the projection P⁵ thereon engages with an arm A¹² similar to arm A¹¹ on the shaft S¹⁶, and again locks all the keys except numeral 1. For pence, an eccentric bearing S¹⁷ is fitted to the shaft S⁸, and a twelve toothed wheel W⁸ mounted thereon. The corresponding indicator drum shows 0 to 11. The spaces are slightly smaller than the decimal spaces and are also slightly projected forward. One wheel gears with that on the left of the drum and the carry over takes place between 11—0 and 0—11. The two locking pawls L² and L⁴ operate as before. See Fig. 14. The wheel to the left of the drum is fitted with ten pins or teeth, and the projection on the periphery of the adjacent wheel adjusted to suit. The wheel W⁵, which gears with the setting wheels, carries a second wheel fixed to the same boss so that they rotate together, the second wheel gearing with and driving the wheel W⁸.

The roller A³ operated by the numeral key 1 is loose on a boss and is normally held by a spring in position to add 10. When moved by its cam, it engages with a projection on the boss at a point from which it will move the sector through the space necessary to add 1. When the carriage moves into the first pence space another projection P⁵ thereon moves a swinging lever L⁷ and by means of a connecting rod a loose clutch member C¹⁰ on the sector shaft S² (Fig. 7). The movement of the loose clutch member C¹⁰ places it in contact with a projection on the boss of the lever A², and therefore, when the key is operated it will print 1 and add 10. On passing into the second pence space, the swinging lever L⁷ and clutch are released.

In a machine fitted with two totalizers (see Fig. 16) a second setting wheel W³ actuated by the rotation of the shaft S³ is fitted in an extension of the carriage and arranged to engage with the wheels W⁵ of the first totalizer when the first setting wheel W³ is in engagement with the corresponding range of wheels in the second totalizer. If the wheels of the second carriage engage the wheels of the first totalizer to subtract, and the second totalizer is employed to print the total of the first totalizer in the second money column, the first totalizer will be returned to zero, thereby proving the correctness of the transfer, and at the same time will be cleared ready for the next entry.

What I claim as my invention and desire to protect by Letters Patent is:—

1. In a calculating machine, the combination, with numeral keys, of a traversing carriage with double setting wheels mounted thereon to which wheels the movement of the numeral keys is imparted, a shaft on which the carriage travels to and fro, a totalizer with which the wheels on the carriage are operatively engaged, means for moving said totalizer laterally in one direction to engage one setting wheel, and means separate from the last-named means for moving said totalizer laterally in the opposite direction to engage the other setting wheel, whereby the same movement of the numeral keys and their operative connections may be employed for addition or subtraction according to the position of the totalizer, substantially as described.

2. In a calculating machine, the combination, with a plurality of numeral keys, of a series of cam plates connecting with corresponding numeral keys, a series of roller levers one for each cam plate, a shaft whereon said levers are mounted, a sector mounted on said shaft, a shaft having gear connections with said sector, a carriage traversing the second named shaft and having wheels rotated thereby, and a totalizer with which the wheels of the carriage operatively engage, substantially as described.

3. In a calculating machine, the combination, with the numeral keys, of a series of cam plates having hooked rods thereon, side plates to operate such hooked rods, and depending hook catches with which the hooked rods engage to lock all the numeral keys but the one depressed, substantially as described.

4. In a calculating machine, the combination, with numeral keys and a traversing carriage, of a pence totalizer constructed with a twelve-tooth wheel, an eccentric adjacent thereto on which the wheel is mounted, and a ten tooth wheel with which the first-named wheel gears and causes a carry over for one complete revolution of said first named wheel.

5. In a calculating machine, the combination, with the platen, the numeral keys, the carriage and the totalizer, of an auxiliary rack for controlling the relative movements of the carriage and the platen, substantially as described.

6. In a calculating machine, the combination, with the platen and the numeral keys, of a traversing carriage carrying operating wheels, an auxiliary rack to control the movement of the carriage, a pawl on the carriage to engage the rack, means for lifting the pawl when a key is depressed, and other means connecting the carriage with the platen, substantially as described.

7. In a calculating machine, the combination, with a traversing carriage, a totalizer and gearing between the carriage and the totalizer; of a shaft; gearing between said shaft and the first-named gearing; an arm loose on said shaft for actuating the latter when coupled thereto, to print 1 and add 10 for tens of pence; a clutch member actuated by the movement of said carriage for coupling said arm to said shaft; and means for actuating said arm.

8. In a calculating machine, the combination, with a carriage, a shaft whereon the same is arranged to travel, the wheels mounted in said carriage and rotated by said shaft; of a totalizer having wheels operatively engaged by the first-named wheels; a shaft having gear connections with the carriage shaft; an arm loose on the second-named shaft for actuating the latter when coupled thereto, to print 1 and add 10 for tens of pence; a clutch member on said second-named shaft actuated by the movement of said carriage for coupling said arm to said shaft; and means for actuating said arm.

In testimony whereof I have hereunto set my hand in presence of two subscribing witnesses.

HENRY SHEPLEY BOOTH.

Witnesses:
   J. Owden O'Brien,
   Geo. H. O'Brien.